United States Patent [19]

Yoshida et al.

[11] Patent Number: 5,185,854

[45] Date of Patent: Feb. 9, 1993

[54] DOCUMENT PROCESSING APPARATUS HAVING A RULED LINE PRINT CONTROL FUNCTION

[75] Inventors: Hiroichi Yoshida, Nara; Hiroko Murai, Yamatokoriyama, both of Japan

[73] Assignee: Sharp Kabushiki Kaisha, Osaka, Japan

[21] Appl. No.: 467,018

[22] Filed: Jan. 18, 1990

[30] Foreign Application Priority Data

Jan. 19, 1989 [JP] Japan ................................. 1-10156

[51] Int. Cl.$^5$ ............................................ G06F 15/20
[52] U.S. Cl. ...................................... 395/117; 395/145
[58] Field of Search .............. 364/518,521, 523, 200, 364/900; 395/112, 117, 140-143, 144-149

[56] References Cited

U.S. PATENT DOCUMENTS

| | | | |
|---|---|---|---|
| 4,495,600 | 1/1985 | Kikuchi et al. | 364/900 |
| 4,675,844 | 6/1987 | Yasuda et al. | 364/900 |
| 4,760,552 | 7/1988 | Yano | 364/900 |
| 4,807,123 | 2/1989 | Komatsu et al. | 364/200 |
| 4,850,726 | 7/1989 | Kimura et al. | 364/900 X |
| 4,953,108 | 8/1990 | Kato et al. | 364/523 |

FOREIGN PATENT DOCUMENTS 61-6762  1/1986  Japan .

Primary Examiner—Heather R. Herndon
Attorney, Agent, or Firm—Sandler Greenblum & Bernstein

[57] ABSTRACT

A document processing apparatus having a ruled line print control function includes an input device for inputting a ruled line, a storage device for storing the ruled line, a ruled line print control device for controlling the printing of the ruled line and a printing device. When the ruled line print control device receives instructions to print from the input device, the ruled line print control device reading ruled lines in a range to be printed from the storage device, deciding for every ruled line read from the storage device whether or not the ruled line needs to be printed, and outputting only the ruled lines decided as the ones that need to be printed. The speed of printing is improved and a print ribbon necessary for printing is economized.

8 Claims, 9 Drawing Sheets

RULED LINE 0 :
    THIN LINE
RULED LINE 2 :
    DOUBLE LINES

FIG. 3

RULED LINE BUFFER

| INITIAL COORDINATES | LAST COORDINATES | KINDS OF RULED LINE | PRINT LEVEL |
|---|---|---|---|
| 1,1 | 1,6 | 2 | |
| 3,1 | 3,6 | 0 | |
| 5,1 | 5,6 | 2 | |
| 1,1 | 5,1 | 2 | |
| 1,3 | 5,3 | 0 | |
| 1,6 | 5,6 | 2 | |

21a  21b  21c  21d

RULED LINE
0 : THIN LINE
1 : THICK LINE
2 : DOUBLE LINE
3 : BROKEN LINE

RULED LINE
- 0 : THIN LINE
- 1 : THICK LINE
- 2 : DOUBLE LINE
- 3 : BROKEN LINE

RULED LINE BUFFER

| INITIAL COORDINATES | LAST COORDINATES | KINDS OF RULED LINE | PRINT LEVEL |
|---|---|---|---|
| 1,1 | 1,6 | 2 | 0 |
| 3,1 | 3,6 | 0 | 1 |
| 5,1 | 5,6 | 2 | 0 |
| 1,1 | 5,1 | 2 | 0 |
| 1,3 | 5,3 | 0 | 1 |
| 1,6 | 5,6 | 2 | 0 |

DOCUMENT PROCESSING APPARATUS HAVING A RULED LINE PRINT CONTROL FUNCTION

BACKGROUND OF THE INVENTION (1) Field of the Invention

The present invention relates to a document processing apparatus with a printing device connected thereto or provided therein and, more particularly, it relates to a document processing apparatus having a ruled line print control function which is capable of specifying a ruled line to be printed.

(2) Description of the Prior Art

Conventionally in this type of document processing apparatus, when the print mode is chosen, decision about whether or not ruled lines in the document need to be printed is made to choose either printing all the ruled lines inputted in the document or printing no ruled lines inputted in the document.

Unexamined Japanese Patent Publication No. 6762/1986 discloses a document processing apparatus in which ruled lines are classified into ruled lines to be printed and control ruled lines not to be printed. The control ruled lines are used for making a layout of a document. Sentences, tables, etc. are inputted using the control ruled lines as guide lines, so as to be able to easily create a document in accordance with the layout.

However, this conventional document processing apparatus is incapable of deciding for every ruled line whether or not the ruled line needs to be printed. Specifically, when a page contains only one ruled line to be printed, there always arises the problem that other ruled lines not need to be printed are printed all together. Further, since printing only one thin line requires some length of a printer ribbon, the above problem causes the disadvantage that the running cost is increased. In addition to that, unnecessary ruled lines are printed, and this causes the disadvantage that the efficiency in the printing operation is reduced.

SUMMARY OF THE INVENTION

A document processing apparatus having a ruled line print control function according to the present invention comprises input means for inputting character information, ruled line information including data of a straight line and a frame and instructions about printing; storage means operatively connected to the input means, for storing the character information and the ruled line information; ruled line print control means operatively connected to the input means and the storage means, for reading the ruled line information existing in a range to be printed from the storage means when instructions to print are applied from the input means and controlling the printing for every ruled line information; and printing means operatively connected to the ruled line print control means, for printing the character information and the ruled line information, whereby when sentences with ruled lines are printed, the ruled lines, such as ruled lines making up a table, which absolutely need to be printed are chosen and printed.

In order to automatically choose the ruled lines which need to be printed, the ruled line print control means selects the ruled lines to make up a frame among the ruled line information read from the storage means, calculates the circumference of the frame, decides whether or not the circumference of the frame is below a specified length and whether or not character information exists in the frame made up of the ruled lines, and specifies the ruled lines as the ones that need to be printed, when the circumference of the frame is below the specified length or when the character information exists in the frame made up of the ruled lines.

In order to allow an operator to choose the ruled lines which need to be printed, the input means can decide for every ruled line information about whether or not the ruled line needs to be printed when the ruled line information is inputted, the storage means can store the ruled line information and the print information inputted from the input means correspondently with each other, and the ruled line print control means selects only the ruled lines specified as the ones that need to be printed among the ruled lines read from the storage means and gives instructions to print the ruled lines.

According to the present invention, the printing operation can be so performed that the ruled lines which are components of a table and need to be printed are printed, and other ruled lines which do not need to be printed are not printed. As a result, a print ribbon is economized, and the speedy printing is effectively performed.

DESCRIPTION OF THE DRAWINGS

An embodiment of the invention will now be described by way of example and with reference to the accompanying drawings, in which:

FIGS. 1 to 6 are views relating to embodiments of a document processing apparatus of the present invention;

DESCRIPTION OF THE PREFERRED EMBODIMENTS

Figure 1:
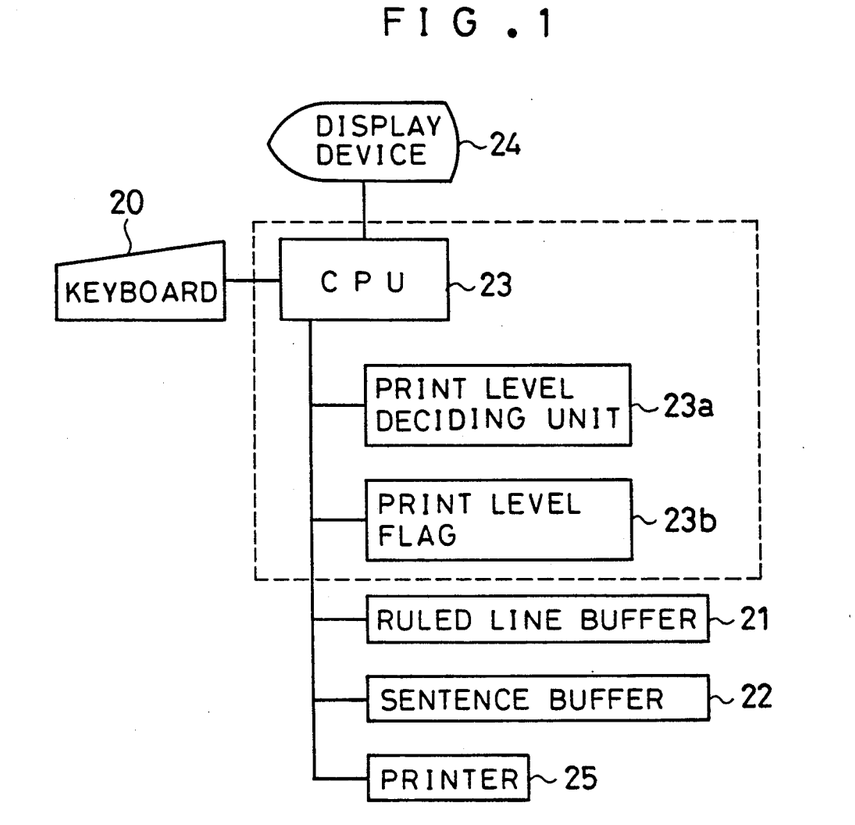
FIG. 1 is a block diagram showing a constitution of the document processing apparatus.

As shown in FIG. 1, a document processing apparatus includes a keyboard 20 serving as input means, a ruled line buffer 21 serving as storage means for storing ruled line information, a document buffer 22 serving as storage means for storing information about sentences and a CPU (central processing unit) 23 serving as ruled line print control means. The keyboard 20 includes character input keys, various kinds of function keys such as ruled line input keys and a print key, and is used for inputting characters, ruled lines and for giving instructions to print them and for specifying for every ruled line whether or not the ruled line needs to be printed. The ruled line buffer 21 may be a ROM for storing the ruled lines inputted from the keyboard 20 and for storing the decision, which is made for every inputted ruled line, whether or not the ruled line needs to be printed. The sentence buffer 22 may be a ROM for storing a sentence inputted from the keyboard 20. The CPU 23 includes a print level deciding unit 23a and a print level flag 23b, and carries out processes (a), (b) explained below, in accordance with a program stored in a program memory (not shown):

(a) When instructions to print are given from the keyboard 20, to read ruled lines in a range to be printed in an inputted document from the ruled line buffer 21, select closed frame lines (lines ruled to make a frame or a box) among the ruled lines read, calculate the length of each of the ruled lines based upon coordinates, compare the calculated length of the ruled line with specified values set for every size of a sheet, and when the result of the comparison is below a specified value or when character information exists in the closed frame lines, give instructions to print the closed frame lines read from the ruled line buffer 21; and (b) When instructions to print are given, to read ruled lines in a range to be printed from the ruled line buffer 21 and sequentially read the decision whether or not the ruled lines need to be printed, and give instructions to print the ruled lines decided as the ones that need to be printed.

The document processing apparatus further includes a display device 24 which may be a CRT or an LCD for displaying various kinds of information in editing sentences and ruled lines, and a printer 25 serving as printing means for printing the ruled lines and sentences specified as the ones that need to be printed.

The circumferential length of the aforementioned closed frame lines is given by reading the coordinates of each of the ruled lines making up a frame from the ruled line buffer 21, finding segments in the horizontal and vertical directions and summing all the lengths of the segments to find the circumference of the frame. The aforementioned specified value is, for example, determined as 500 mm when a sheet used for printing is about 7.20×10.11 inches in size. The specified value is decided so that a frame drawn in a space corresponding to about a half of the sheet or a smaller frame is necessarily to be printed. Further, in order to decide whether or not the ruled lines which have been read make up a frame, it is confirmed whether or not a plurality of vertical ruled lines join a horizontal ruled line which is given from the coordinates of the ruled lines.

Figure 2:
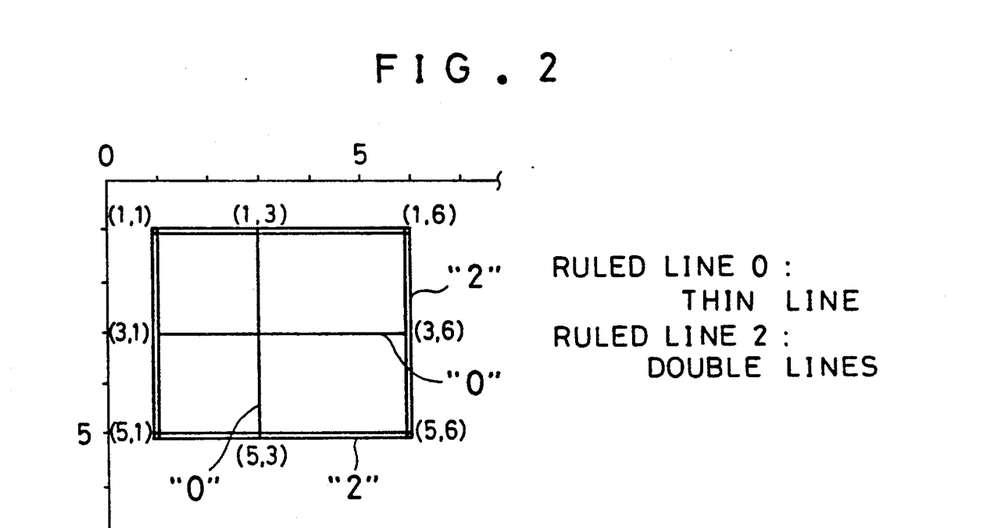
FIG. 2 is a diagram presented for explaining a state of inputting ruled lines according to a first embodiment.

FIG. 2 shows a state of inputted ruled lines. The coordinates in the figure is presented for explanation.

Figure 3:
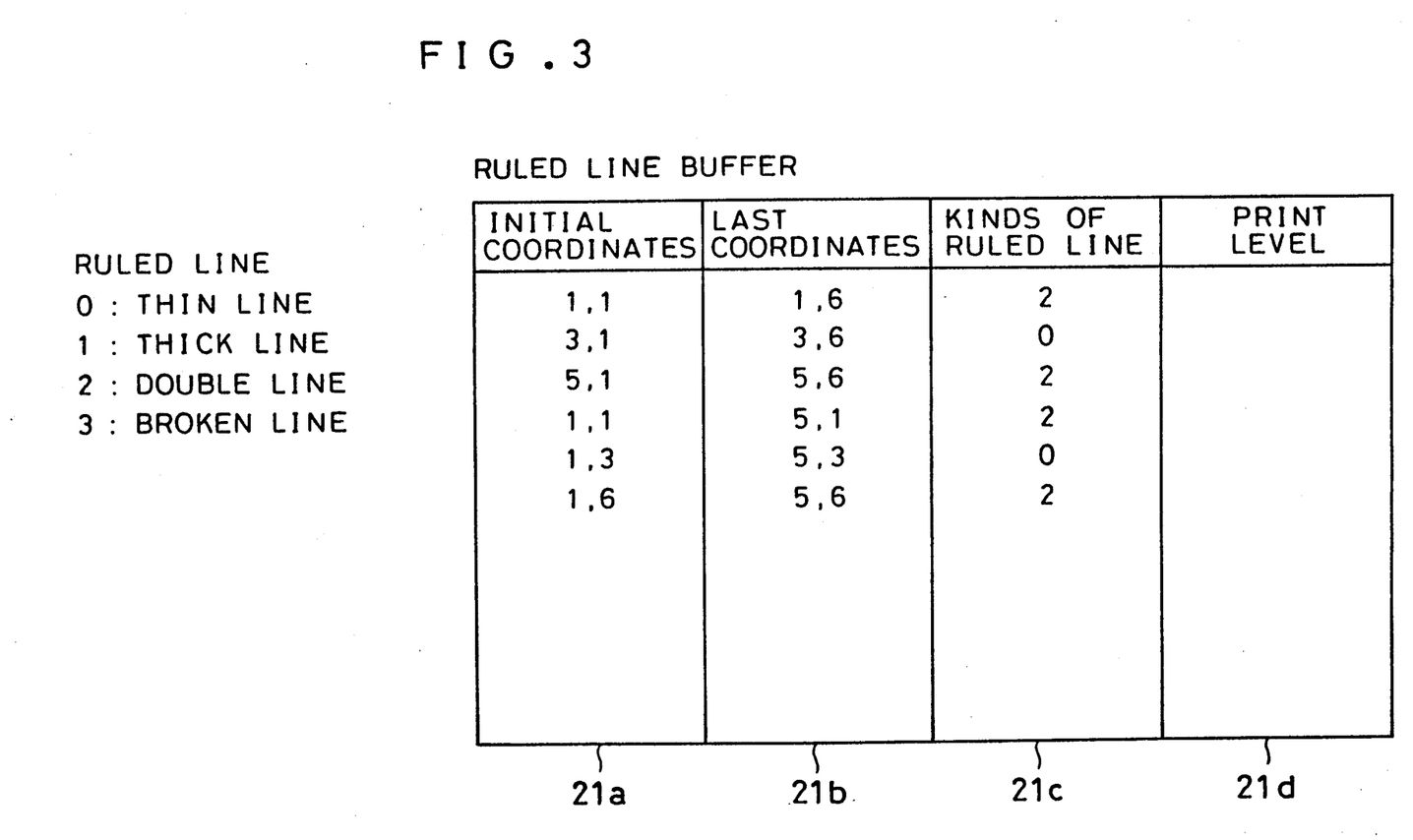
FIG. 3 is a diagram presented for explaining the contents of a ruled line buffer of the first embodiment.

FIG. 3 shows the contents stored in the ruled line buffer 21. The ruled line buffer 21 includes an initial coordinates storing area 21a for storing the coordinates on the initial point of a line segment with regard to a single ruled line, an end coordinates storing area 21b for storing the coordinates on the terminal point of the line segment with regard to the single ruled line, ruled line type storing area 21c and print level storing area 21d. In the initial coordinate storing area 21a and the end coordinate storing area 21b, the ruled lines inputted as shown in FIG. 2 are stored as coordinates. In the ruled line type storing area 21c, kinds of ruled lines, which is set when those ruled lines are inputted, are stored with numerical values (0: thin line, 1: thick line, 2: double line, 3: broken line). In the print level storing area 21d, information about whether or not the ruled lines need to be printed is stored as a result of the decision about the same. The information about whether or not the ruled lines need to be printed is stored with print level flag "1" or "0". The "1" means that the ruled line needs to be printed, and the "0" means that the ruled line does not need to be printed.

Then, the operation of the first embodiment of the present invention will be described with reference to FIGS. 4(a) to 4(c).

Figure 4A:
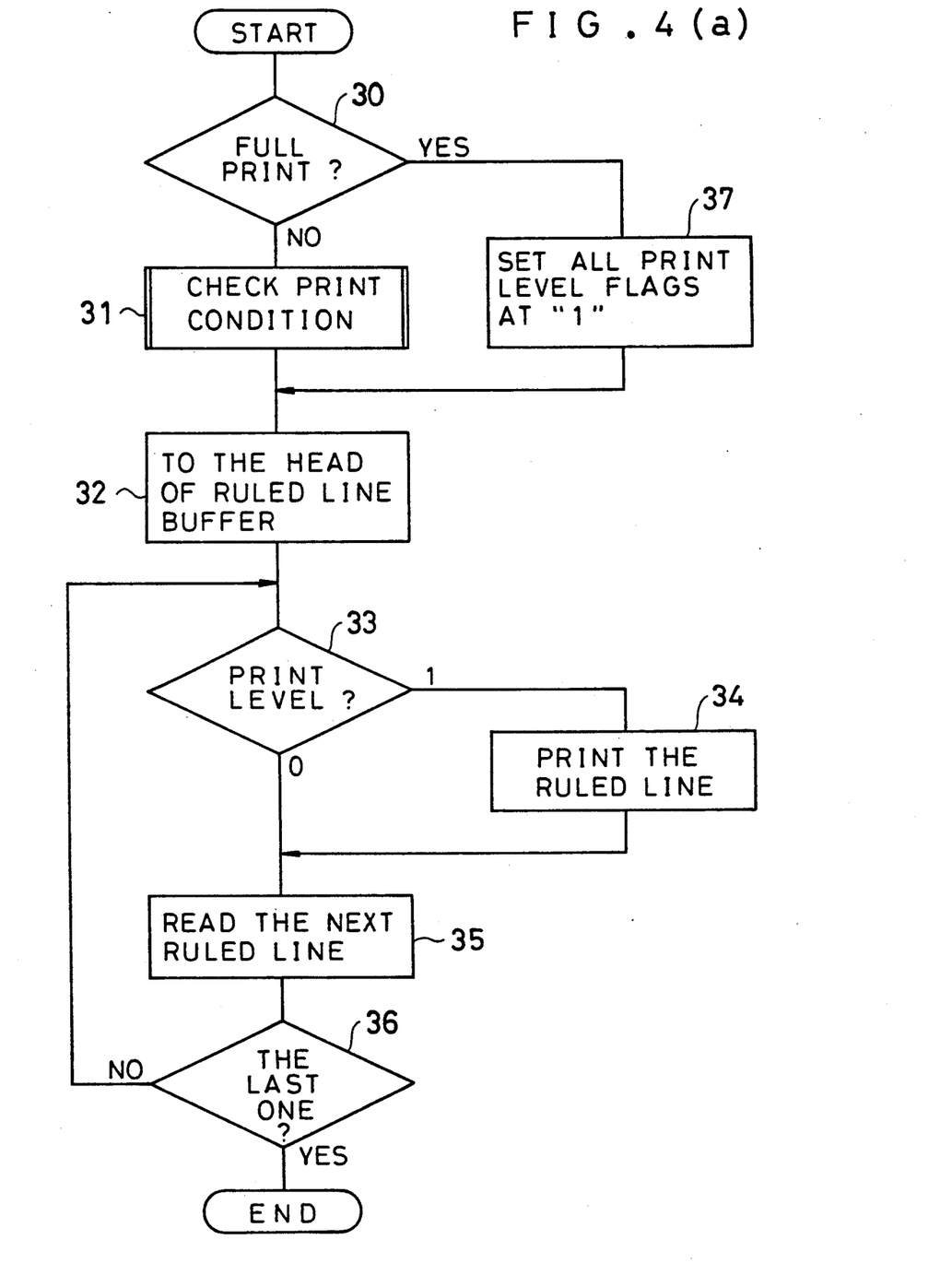
FIGS. 4(a) to 4(c) are flow charts presented for explaining the operation of the first embodiment.
Figure 5:
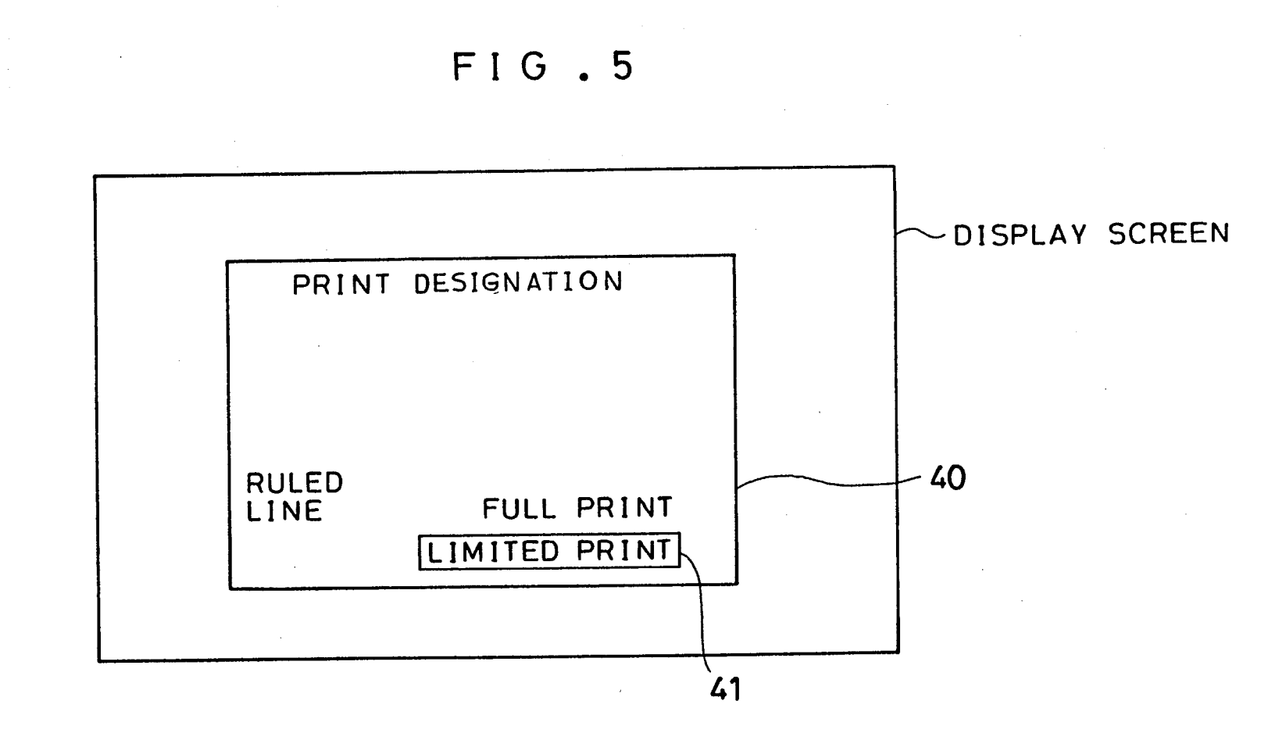
FIG. 5 is a diagram showing a window for a print designation.

In FIG. 4(a), it is assumed that a number of coordinates of an inputted ruled line are stored in the ruled line buffer 21. First, a print key of the keyboard 20 is depressed to read a print designation window 40 (see FIG. 5). Then, a cursor 41 is moved to choose a mode between the full print mode where all the ruled lines are printed and the limited print mode where printing is performed conditionally. In the case where the limited print mode is chosen, it is confirmed that the full print mode is not chosen, or that the result of the decision is NO (step 30), and then the conditions for printing are checked for the ruled lines read from the ruled line buffer 21 (step 31). As stated above, the conditions for printing the ruled lines are (a) that the circumference of closed frame lines is below a specified value and (b) that the closed frame lines makes a table format and the table contains characters. When either of these conditions is satisfied, the print level flag is set at "1", but neither of these conditions is satisfied, the print level flag is set up to "0". Since the circumferential length of the ruled lines inputted in this embodiment is below the specified value, the print level flag is set up to "1". Then, the head of the information stored in the ruled line buffer 21 is retrieved (step 32). It is decided whether the print level flag is set up to "0" or "1" (step 33), and since the print level flag is set up to "1" in this case, the ruled line (line joining the coordinates (1, 1) and (1, 6)) stored in the head is printed (step 34). Then, the ruled line stored second in the ruled line buffer 21 is read (step 36). The process returns to step 33, and the process steps 33 to 35 are repeated to print the ruled lines sequentially. At step 30, when the answer is YES, that is, the full print is chosen, the print level flags in the print level area 21d are all set up to "1" (step 37).

Figure 4B:
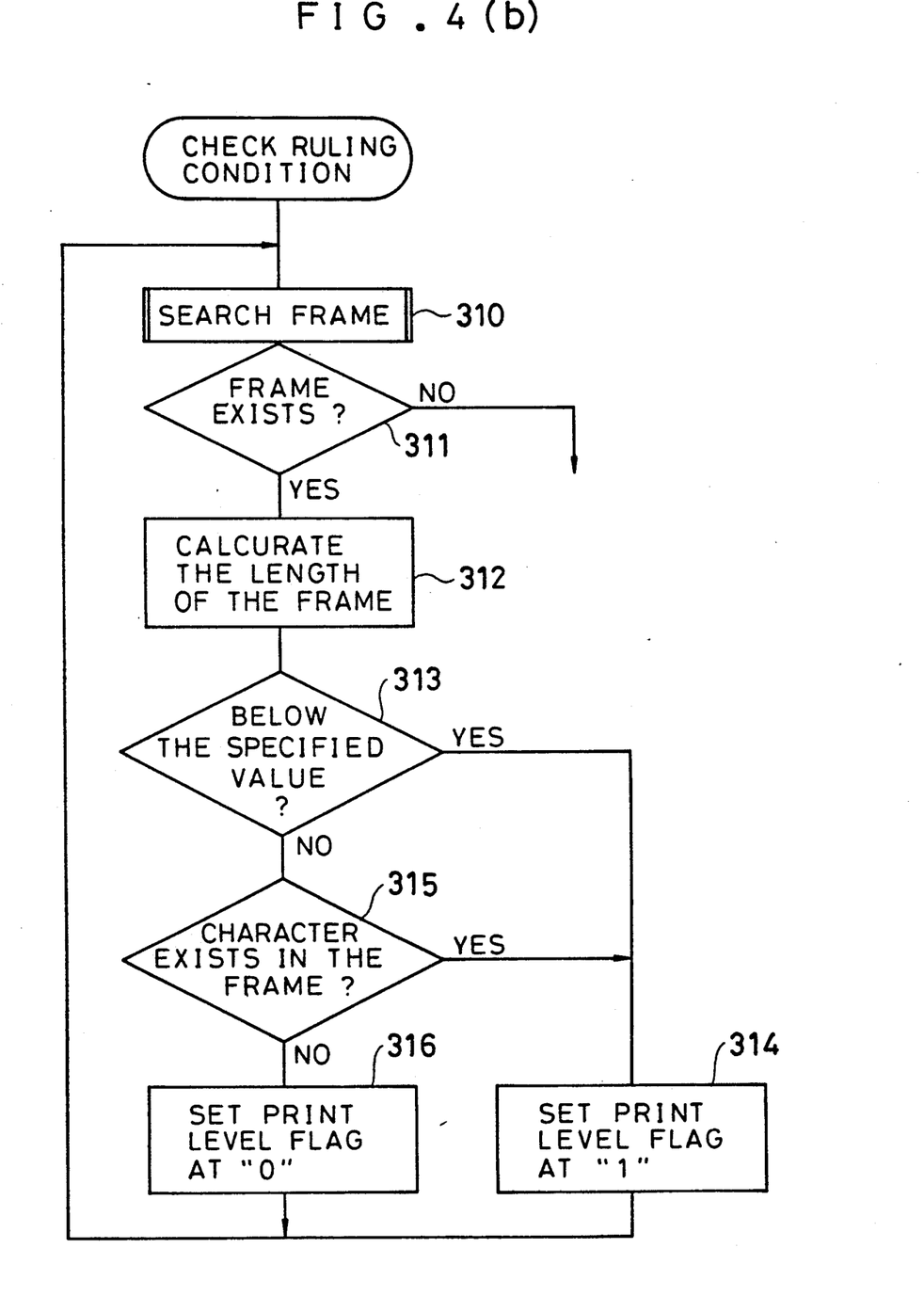

FIG. 4(b) is a flow chart showing the processing of checking the print conditions of the step 31 in detail. In order to check the print conditions, first, the closed frame lines are searched (step 310), and it is decided whether or not the closed frame lines exist (step 311). When the result of the decision is YES, the circumferential length of the closed frame lines is calculated (step 312). Then, it is decided whether or not the calculated circumferential length of the closed frame line is below the aforementioned specified value (step 313), and the result of the decision is YES, the print level flag for the searched ruled line is set up to "1" (step 314).

At step 313, when the result of the decision is NO, it is further decided whether or not characters exist in the closed frame lines (step 315). When the result is YES, the process proceeds to step 314, and when the result is NO, the print level flag is set up to "0".

Figure 4C:
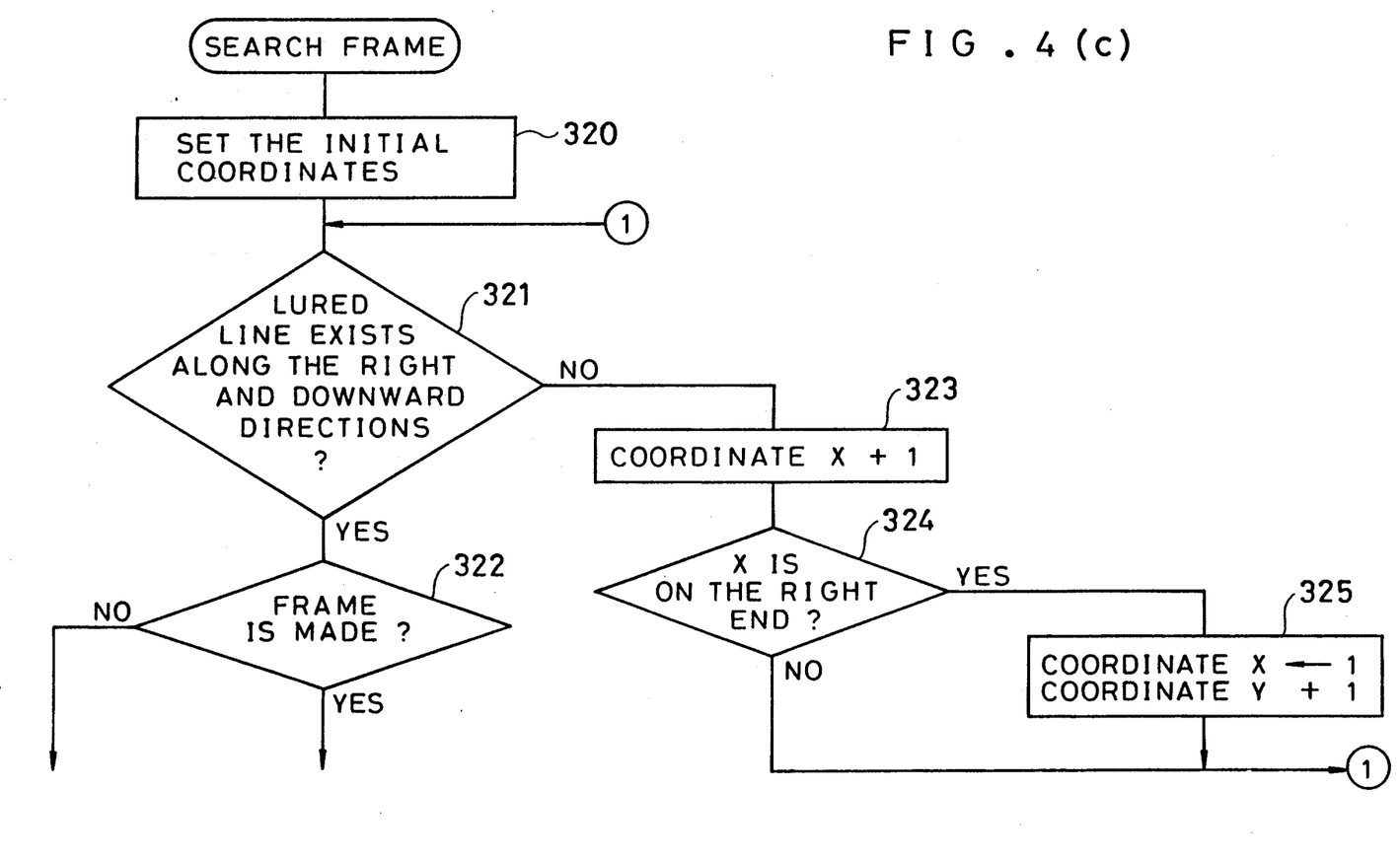

FIG. 4(c) is a flow chart showing the process of searching the closed frame lines shown at steps 310, 311 in detail. In order to search the closed frame lines, first, the initial coordinates is stored in a buffer of the CPU 23 (step 320). In this embodiment, the coordinates (1, 1) corresponding to the initial point of the ruled line shown in FIG. 2 is set. Then, the coordinates are used as the reference to decide whether or not ruled lines exist along the right direction and the downward direction (step 321). When the result of the decision is YES, it is confirmed whether or not the ruled lines can be traced along the right direction, the downward direction, the left direction and the upward direction in this order so as to decide whether or not those ruled lines are closed frame lines (step 322). At step 321, the result of the decision is NO, "1" is added to the coordinate X of the initial coordinates (step 323), and then it is decided whether or not the resultant coordinates comes to the right end (step 324). When the result of the decision is NO, the process returns to step 321, and it is decided whether or not further closed frame lines exist. The result of the decision is YES, the coordinate X is reset at "1", and simultaneously "1" is added to the coordinate Y (step 325) so as to search the next ruled lines for still further closed frame lines.

Then, the operation of the second embodiment of the present invention will be described with reference to FIG. 6.

Figure 6:
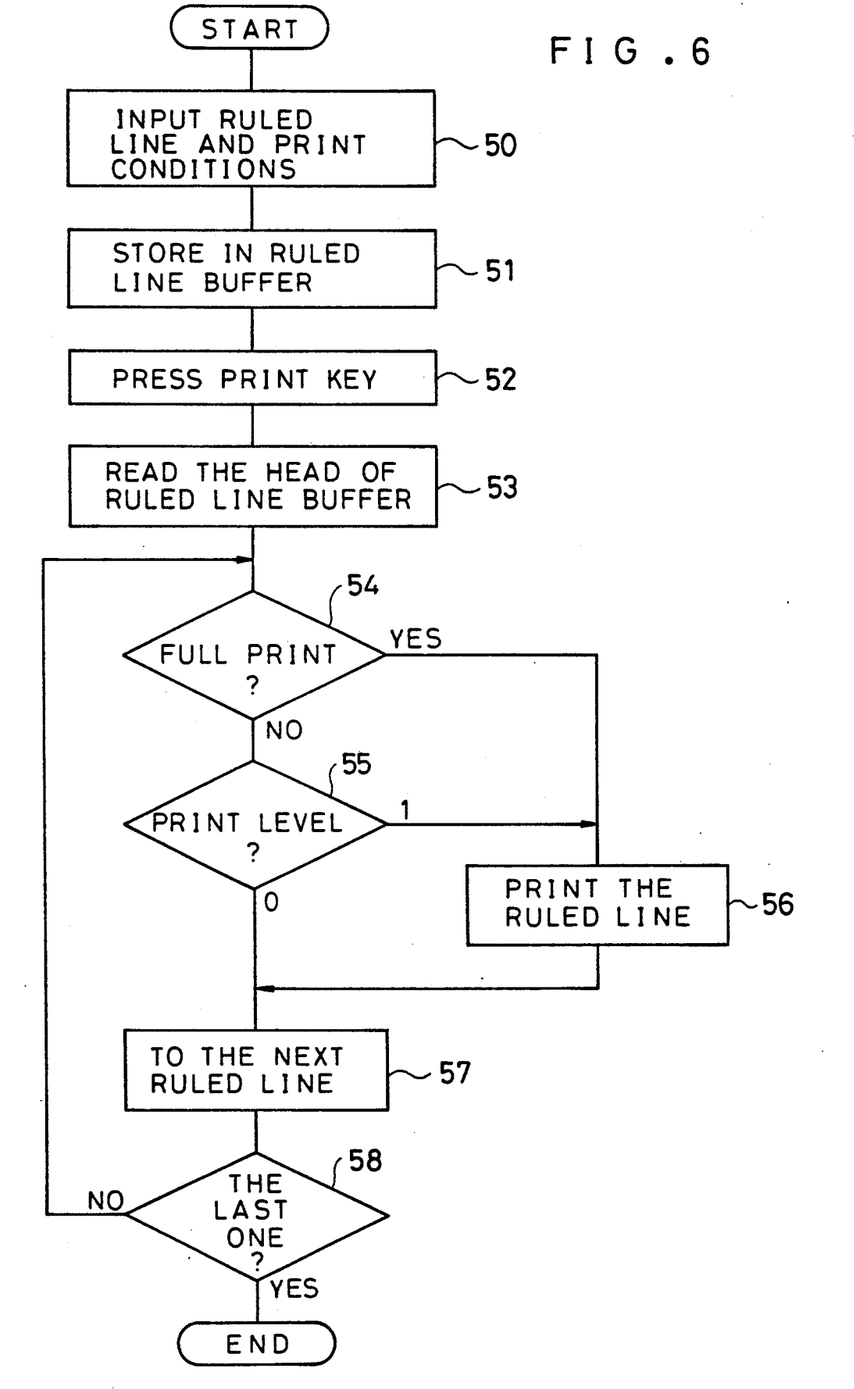
FIG. 6 is a flow chart presented for explaining the operation of a second embodiment.
Figure 7:
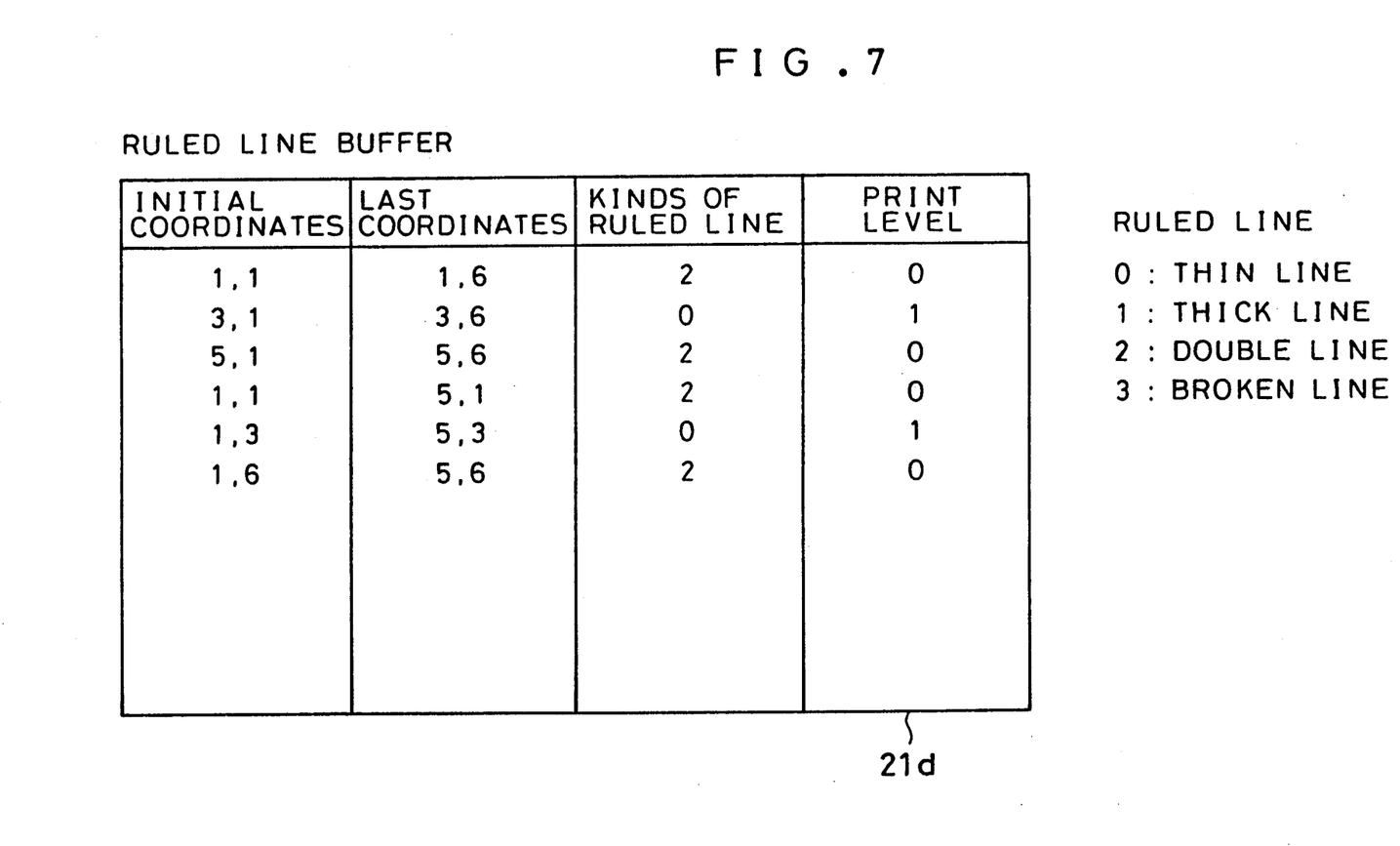
FIG. 7 is a diagram showing the contents of a ruled line buffer of the second embodiment.
Figure 8:
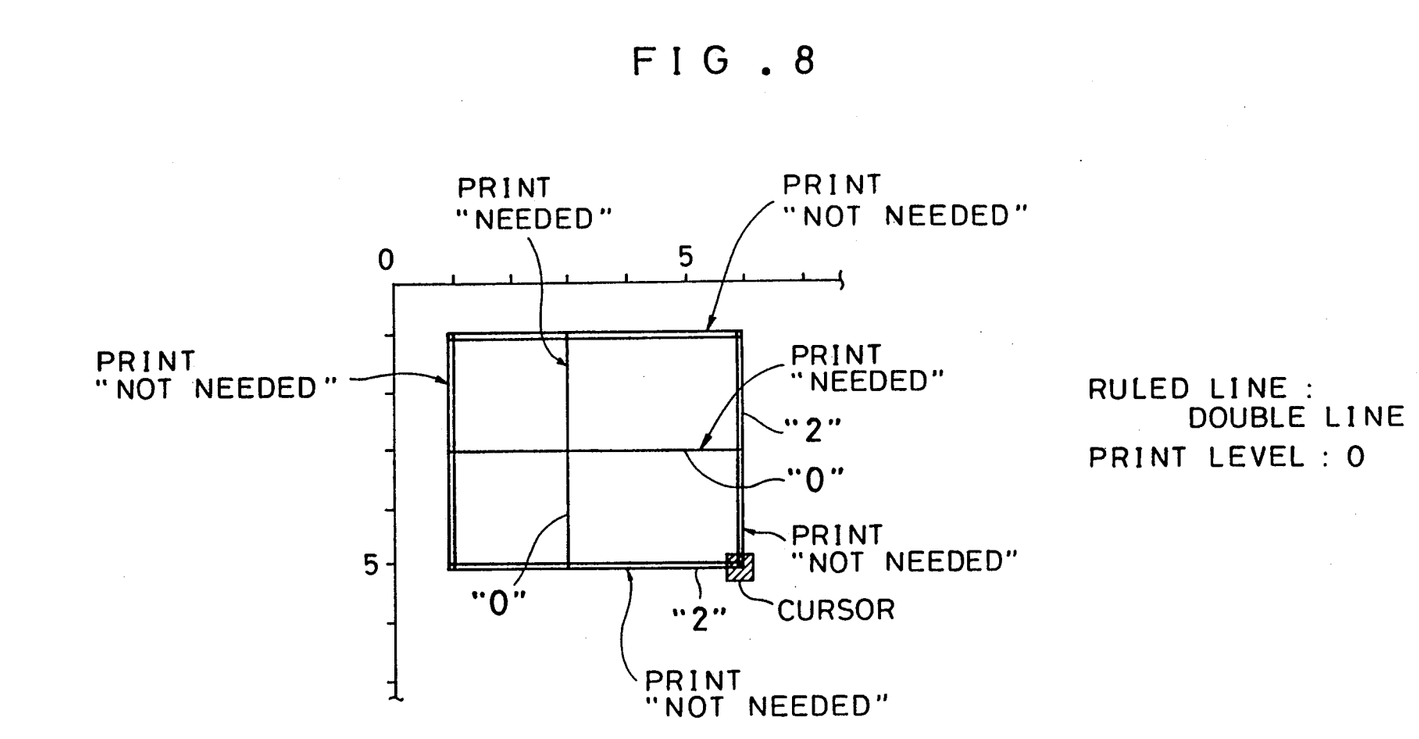
FIG. 8 is a diagram presented for explaining a state of inputting ruled lines according to the second embodiment.

In FIG. 6, a cursor is moved in the input screen to input ruled lines. Simultaneously, the kinds of the ruled lines are specified, and whether or not the ruled lines need to be printed is decided (step 50). As a result, the coordinates of the inputted ruled line are stored in the initial coordinate storing area 21a and the end coordinate storing area 21b, the kinds of the inputted ruled lines are stored in the ruled line type storing area 21c, and the decision about whether or not the ruled lines need to be printed is stored in the print level storing area 21d (step 51). FIG. 7 shows the result of the storage of these data of the ruled line buffer 21. When the ruled lines shown in FIG. 8 are inputted and whether or not each of the ruled lines needs to be printed is decided, the print level is stored with a flag "1" or "0" in the print level storing area 21d of the ruled line buffer 21 (see FIG. 7). When the print key is depressed (step 52), the ruled lines stored in the head of the ruled line buffer 21 are read (step 53), and the decision about whether or not the full print mode should be chosen is made (step 54). When the limited print mode is chosen, the CPU 23 decides whether the print level flag of the read rules lines is "1" or "0" by referring to the contents of the print level storing area 21d (step 55). When the print level flag is "1", the ruled lines are printed (step 56), and when the print level flag is "0", the ruled lines are not printed but the next ruled lines stored in the ruled line buffer 21 are read (step 57). It is decided whether or not ruled lines are not stored any more, that is, whether or not the ruled line read immediately before step 57 is the last one to be printed (step 58). When the result of the decision is No, the process returns to step 54, and the process of steps 54 to 57 are repeated. When the result is YES, the printing is completed.

The present invention is not limited to the above embodiments, but other embodiments can be substituted for them and modifications can be made; for example, the equivalent effects to those of the present invention can be obtained even when the document processing apparatus is a word processor or an office computer, or when the character information includes various language, symbols and numerical figures.

What is claimed is:

1. A document processing apparatus having a ruled line print control function, comprising:
   input means for inputting character information, ruled line information including data of a straight line in a frame and instructions about printing;
   storage means operatively connected to said input means, for storing the character information and the ruled line information;
   ruled line print control means, operatively connected to said input means and said storage means, for reading the ruled line information existing in a range to be printed from said storage means when instructions to print are applied from said input means and controlling the printing for every ruled line information; and
   printing means operatively connected to said ruled line print control means, for printing the character information and the ruled line information, said input means further comprising means for selecting among a plurality of printing modes, said plurality of printing modes comprising a full print mode and a limited print mode.

2. An apparatus according to claim 1, wherein said ruled line information includes at least the coordinates on the initial point of a line segment and the coordinates on the terminal point of the line segment with regard to a single ruled line.

3. An apparatus according to claim 1, wherein said input means comprises means for specifying for every ruled line information about whether or not the ruled line needs to be printed when the ruled line information is inputted, said storage means can store ruled line information and print information inputted from said input means correspondingly with each other, and said ruled line print control means selects only the ruled lines specified as the ones that need to be printed among the ruled lines read from said storage means and gives instructions to print the ruled lines.

4. An apparatus according to claim 3, wherein said storage means is a ROM storing ruler line information comprising the coordinates of the initial point of a ruled line segment, the coordinates of the terminal point of the ruled line segment and a flag indicating whether or not the ruled line needs to be printed.

5. An apparatus according to claim 1, wherein in said full print mode all of the ruled lines are printed and in said limited print mode the ruled lines are printed in accordance with the ruled line information.

6. An apparatus according to claim 1, wherein in said full print mode more ruled lines are printed than in said limited print mode.

7. A document processing apparatus having a ruled line print control function, comprising:
   input means for inputting character information, ruled line information including data of a straight line in a frame and instructions about printing;
   storage means operatively connected to said input means, for storing the character information and ruled line information;
   ruled line print control means, operatively connected to said input means and said storage means, for reading the ruled line information existing in a range to be printed from said storage means when instructions to print are applied from said input means and controlling the printing for every ruled line information; and
   printing means operatively connected to said ruled line print control means, for printing the character information and the ruled line information, said input means further comprising means for selecting among a plurality of printing modes, said plurality of printing modes comprising a full print mode and a limited print mode, wherein said ruled line print control means selects the ruled lines to make up a frame among the ruled line information read from said storage means, calculates the circumference of the frame, decides whether or not the circumference of the frame is below a specified length and whether or not character information exists in the frame made up of the ruled lines, and specifies the ruled lines as the ones that need to be printed, when the circumference of the frame is below the specified length or when the character information exists in the frame made up of the ruled lines.

8. A document processing apparatus having a ruled line print control function, comprising:

input means for inputting character information, ruled line information including data of a straight line in a frame and instructions about printing;

storage means operatively connected to said input means, for storing the character information and ruled line information;

ruled line print control means, operatively connected to said input means and said storage means, for reading the ruled line information existing in a range to be printed from said storage means when instructions to print are applied from said input means and controlling the printing for every ruled line information; and printing means operatively connected to said ruled line print control means, for printing the character information and the ruled line information, said input means further comprising means for selecting among a plurality of printing modes, said plurality of printing modes comprising a full print mode and a limited print mode, wherein said ruled line print control means selects the ruled lines to make up a frame among the ruled line information read from said storage means, calculates the circumference of the frame, decides whether or not the circumference of the frame is below a specified length and whether or not character information exists in the frame made up of the ruled lines, and specifies the ruled lines as the ones that need to be printed, when the circumference of the frame is below the specified length or when the character information exists in the frame made up of the ruled lines, and wherein said specified length is at a value preset corresponding to the size of a sheet for printing and equals the length of the circumference of a frame made up of lines drawn in an area of almost a half of a sheet for printing.

* * * * *